US009148518B2

(12) United States Patent
Lo et al.

(10) Patent No.: US 9,148,518 B2
(45) Date of Patent: Sep. 29, 2015

(54) SYSTEM FOR AND METHOD OF PROVIDING VIDEO RING-BACK TONES

(71) Applicant: Cellco Partnership, Basking Ridge, NJ (US)

(72) Inventors: Arnold T. Lo, Edison, NJ (US); Brett I. Rogers, Bethlehem, PA (US)

(73) Assignee: Cellco Partnership, Basking Ridge, NJ (US)

( * ) Notice: Subject to any disclaimer, the term of this patent is extended or adjusted under 35 U.S.C. 154(b) by 83 days.

(21) Appl. No.: 13/829,322

(22) Filed: Mar. 14, 2013

(65) Prior Publication Data

US 2014/0267553 A1 Sep. 18, 2014

(51) Int. Cl.
  *H04N 7/14* (2006.01)
  *H04M 3/56* (2006.01)

(52) U.S. Cl.
  CPC .............. *H04M 3/567* (2013.01); *H04N 7/147* (2013.01)

(58) Field of Classification Search
  USPC ......... 379/207.16, 87, 88.13; 455/414.1, 445, 455/550.1, 561
  See application file for complete search history.

(56) References Cited

U.S. PATENT DOCUMENTS

| 8,620,286 B2* | 12/2013 | Stannard et al. ............ 455/414.2 |
| 2005/0105706 A1* | 5/2005 | Kokkinen ................. 379/201.01 |
| 2006/0147021 A1* | 7/2006 | Batni et al. ............... 379/221.08 |
| 2007/0116253 A1* | 5/2007 | Batni et al. ............... 379/399.01 |
| 2007/0133760 A1* | 6/2007 | Cotignola et al. ........... 379/88.13 |
| 2008/0101554 A1* | 5/2008 | Rhee et al. .................... 379/67.1 |
| 2008/0153499 A1* | 6/2008 | Lindfors et al. .............. 455/445 |
| 2010/0002861 A1* | 1/2010 | Gao et al. .................. 379/207.16 |
| 2010/0166156 A1* | 7/2010 | Xu et al. .......................... 379/87 |
| 2011/0103570 A1* | 5/2011 | Gao et al. .................. 379/207.16 |
| 2011/0124322 A1* | 5/2011 | Jager et al. ................. 455/414.1 |
| 2011/0243317 A1* | 10/2011 | Radziewicz et al. ...... 379/207.16 |
| 2012/0059910 A1* | 3/2012 | Cassidy ........................ 709/219 |
| 2013/0195422 A1* | 8/2013 | Patil et al. ..................... 386/239 |

* cited by examiner

*Primary Examiner* — Joseph J Nguyen (57) ABSTRACT

A system for and method for provisioning video ring back tones (vRBTs) is presented. The system may include one or more network enabled computers configured to receive video content from one or more parties over a network. The video content may be used to create one or more vRBTs. The vRBTs may be associated with one or more subscriber profiles. The vRBTs may be assigned to one or more parties. When a party attempts to place a video call to a subscriber, the vRBT may be played back on the calling party's video-equipped device until the subscriber answers the call, ignores the call, or sends the call to voicemail.

18 Claims, 8 Drawing Sheets

Figure 8 vRBT Subscriber Profile
800

| Subscriber Name | Subscriber Caller ID |
|---|---|
| Party A | (789) 456-0123 |
|  | partyA@gmail.com |

| vRBT Clip | Stored | Assigned Contacts |
|---|---|---|
| vRBT_1 | Database1_vRBT1 | (123) 456-7890 (231) 546-8709 johndoe@gmail.com |
| vRBT_2 | Database1_vRBT2 | (987) 654-3210 janedoe@gmail.com |

SYSTEM FOR AND METHOD OF PROVIDING VIDEO RING-BACK TONES

BACKGROUND INFORMATION

Currently, when placing a call to a telephony device, an audio tone may be played back on the calling device until the receiving party answers the call. Individuals with telephony devices may desire to share video content that may be played back on a telephony device instead of a traditional audio tone. This content may be exchanged between mobile devices using Personal Data Interchange (PDI). PDI occurs when individuals communicate in either a business or personal context. The exchanged information may include business cards, telephone numbers, addresses, dates and times of appointments. Devices that utilize Near Field Communications (NFC) technology or Microsoft vCard features facilitate PDI electronically.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

As the popularity of user generated video continues to grow, individuals may send emails embedded with a vCard to which a video clip and or video tag (that the recipient can be entertained with) is attached. vCards may also be directly exchanged between users using NFC peer-to-peer mode to accomplish PDI.

The description below describes systems and methods for exchanging and provisioning audio-visual ring back tones (RBT) content on video-capable devices, such as smartphones, softphones, tablets, PCs, or laptops. One or more subscribers to telephony or cable services may exchange video content and upload or share that video content with a provider of telephony and/or cable services. When a party places a video call to a subscriber, the provisioning system may play back a video RBT (vRBT) on the calling party's video-equipped device before the subscriber answers the call or the call is sent to voicemail.

The description below describes servers, devices, and network elements that may include one or more modules, some of which are explicitly shown, others are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, network elements, telephony devices, etc.) separately. The functions described as being performed at various components may be performed at other components, and the various components may be combined and/or separated. Other modifications also may be made.

Figure 1:
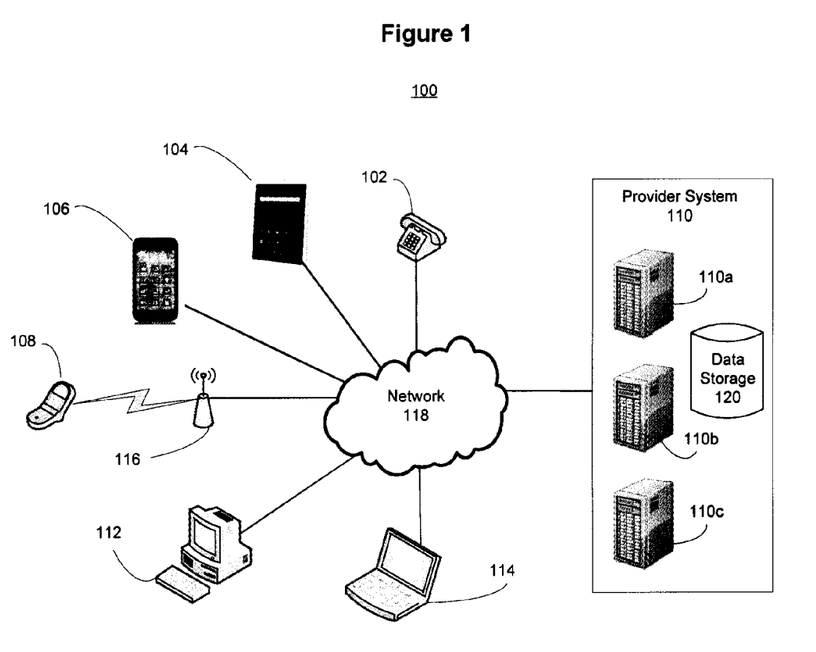
FIG. 1 is a schematic diagram illustrating a system according to a particular embodiment.

FIG. 1 is a schematic diagram of a system for providing video ring-back tones (vRBT) to one or more devices communicatively coupled to a network in accordance with exemplary embodiments. As shown in FIG. 1, in an exemplary embodiment, a system 100 may include user devices 102, 104, 106, 108, 112, and 114, provider system 110, transmitter/receiver 116, and network 118. It is noted that system 100 illustrates a simplified view of various components included in a system for providing vRBT services and that other hardware devices and software not depicted may be included in the system 100. It is also noted that the system 100 illustrates only a single instance of each component. It will be appreciated that multiple instances of these components may be used. Moreover, the system 100 may include other devices not depicted in FIG. 1.

As used herein, the term user device may be, for example, land-line telephony device 102, a tablet computer 104, a smartphone 106, a cellular device 108, a PC 112, or a laptop 114. Other examples of a user device may include a handheld PC, a PDA, a tablet computer, a satellite phone, a handheld MP3 player, a handheld video player, a personal media player, a gaming devices, or other devices capable of communicating with network 118. The user devices may be equipped to play digital videos. The user devices may include Near Field Communication (NFC) capabilities, which may allow for communication with other devices by touching them together or bringing them into close proximity. Exemplary NFC standards include ISO/IEC 18092:2004, which defines communication modes for Near Field Communication Interface and Protocol (NFCIP-1). Other exemplary NFC standards include those created by the NFC Forum.

Provider system 110 may be an IP Multimedia Subsystem or IP Multimedia Core Network Subsystem (IMS). Provider system 110 may be a cable provider system. It may be a combination of the aforementioned systems.

As shown in FIG. 1, provider system 110 may include network elements 110a-110c. Other exemplary embodiments may include more or fewer network elements, depending on the system needs. As referred to herein, a network element may include, but is not limited to: e.g., any computer device, or communications device including, e.g., a server, a network appliance, a personal computer (PC), a workstation, a mobile device, a phone, a handheld PC, a personal digital assistant (PDA), a router, a thin client, a fat client, an Internet browser, or other device. Network elements may include, for example, Telephony Application Servers (TAS), servers equipped with Media Resource Function software (MRF), or Tone Query Servers (TQS). The network elements may be Home Subscriber Servers (HSS). The network elements may be a combination of these and other network-enabled computing devices. The network-enabled computer systems may execute one or more software applications to, for example, receive data as input from an entity accessing the network-enabled computer system, process received data, transmit data over a network, and receive data over a network. The one or more network-enabled computer systems may also include one or more software applications to enable the provisioning of vRBT services, as described herein.

Network elements 110a-110c may include one or more processors for recording, transmitting, receiving, and storing data. Although network elements are depicted as individual elements, it should be appreciated that the contents of one or more of a network elements may be combined into fewer or greater numbers of devices and may be connected to additional devices not depicted in FIG. 1. Furthermore, the one or more devices may be local, remote, or a combination thereof to a network element. According to some embodiments network element 110a may be a residential gateway, a router, a server, or other network infrastructure.

Network elements 110a-110c may provide Application Programming Interfaces ("APIs"), interface tables, Remote Procedure Calls ("RPCs"), web services, Extensible Markup Language ("XML") based interfaces, Simple Object Access Protocol ("SOAP") based interfaces, Common Object Request Broker Architecture ("CORBA") and other interfaces for sending or receiving media searches, preferences or other information.

Network 118 may be a wireless network, a wired network or any combination of wireless network and wired network. For example, network 118 may include one or more of a fiber optics network, a passive optical network, a cable network, a telephony network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, network 118 may include, without limitation, telephone line, fiber optics, IEEE Ethernet 802.3, a wide area network ("WAN"), a local area network ("LAN"), or a global network such as the Internet. Also, network 118 may support an Internet network, a wireless communication network, a cellular network, or the like, or any combination thereof. Network 118 may further include one, or any number of the exemplary types of networks mentioned above operating as a stand-alone network or in cooperation with each other. Network 118 may utilize one or more protocols of one or more network elements to which it is communicatively coupled. Network 118 may translate to or from other protocols to one or more protocols of network devices. Although network 118 is depicted as one network, it should be appreciated that according to one or more embodiments, network 118 may comprise a plurality of interconnected networks, such as, for example, a service provider network, the Internet, a broadcaster's network, a cable television network, corporate networks, and home networks.

User devices 102, 104, 106, 108, 112, 114, transmitter/receiver unit 116, provider system 110, and data storage 120 may transmit and receive data to and from network 118 representing broadcast content, user request content, parallel search queries, parallel search responses, and other data. The data may be transmitted and received utilizing a standard telecommunications protocol or a standard networking protocol. For example, one embodiment may utilize Signaling System Number 7 (SS7). In other embodiments, the data may be transmitted and received utilizing Session Initiation Protocol ("SIP") or H.323. In other embodiments, the data may be transmitted and/or received utilizing using Voice Over IP ("VOW"). In other embodiments, the data may be transmitted and/or received using Voice Over LTE ("VoLTE") or messaging protocols. Data may also be transmitted and/or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving broadcast or parallel search data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Network 118 may use standard wireless protocols including IEEE 802.11a, 802.11b and 802.11g. Network 118 may also use protocols for a wired connection, such as an IEEE Ethernet 802.3.

Transmitter/receiver unit 116 may be a repeater, a microwave antenna, a cellular tower, or another network access device capable of providing connectivity between two different network mediums. Transmitter/receiver 116 may be capable of sending or receiving signals via a mobile network, a paging network, a cellular network, a satellite network or a radio network. Transmitter/receiver 116 may provide connectivity to one or more wired networks and may be capable of receiving signals on one medium such as a wired network and transmitting the received signals on a second medium such as a wireless network.

Provider system 110, transmitter/receiver 116, and data storage 120 may include one or more processors (not shown) for recording, transmitting, receiving, and storing data. Although network elements 110a-110c, transmitter/receiver 116, and data storage 120 are depicted as individual elements, it should be appreciated that the contents of one or more of a network elements 110a-110c, transmitter/receiver 116, and data storage 120 may be combined into fewer or greater numbers of devices and may be connected to additional devices not depicted in FIG. 1. Furthermore, the one or more devices may be local, remote, or a combination thereof of network elements 110a-110c, transmitter/receiver 116, and data storage 120.

Data storage 120 may be network accessible storage and may be local, remote, or a combination thereof to provider system 110 and/or network elements 110a-110c. Data storage 120 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, Data storage 120 may be a database, such as an Oracle database, a Microsoft SQL Server database, a DB2 database, a MySQL database, a Sybase database, an object oriented database, a hierarchical database, or other database. Data storage 120 may utilize flat file structures for storage of data.

Provider system 110 may comprise IMS-based core equipment and may provide to a calling party a video Ring Back Tone (vRBT) resulting from personal data interchange. The vRBT may be based on user-generated content. Provider system 110 may be operated by one or more providers of telephony services. Provider system 110 may be operated by one or more providers of cable services. Network elements 110a-110c may comprise one or more modules, as will be described with reference to FIG. 2.

Figure 2:
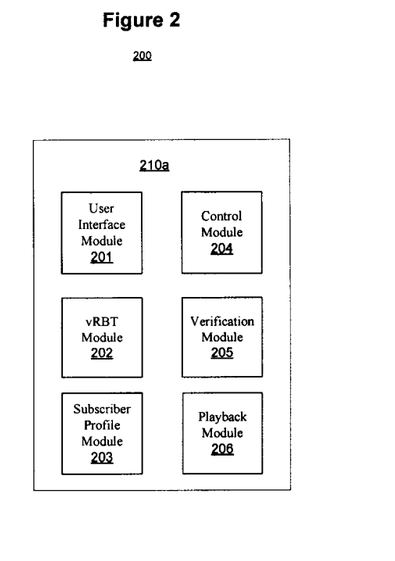
FIG. 2 is a schematic diagram illustrating network element according to a particular embodiment.

FIG. 2 is a schematic diagram of a hardware component of the system of a particular embodiment. Network element 210a may be the same as network element 110a (shown in FIG. 1). As shown in FIG. 2, network element 210 may comprise one or more modules to provide various functionalities associated with providing video ring-back tones in accordance with the embodiments of the present invention. In the exemplary embodiment shown in FIG. 2, network element 210 may comprise a user interface module 201, a vRBT module 202, a subscriber profile module 203, a control module 204, a playback module 206, and a verification module 205.

Figure 3:
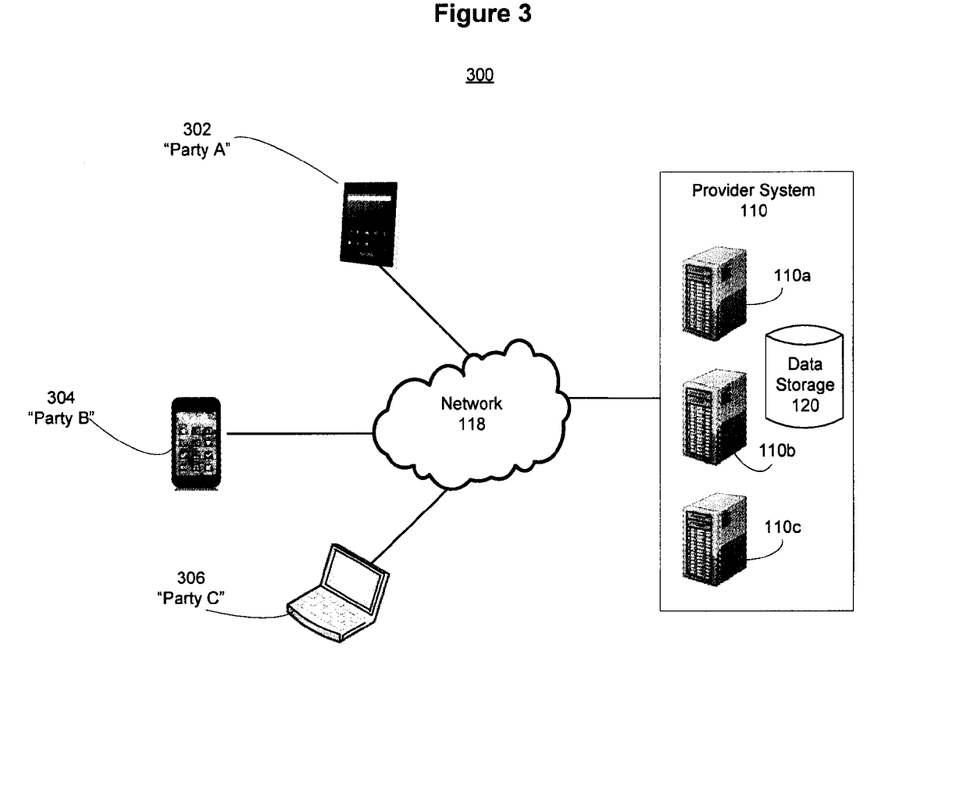
FIG. 3 is a schematic diagram illustrating a system according to a particular embodiment.

FIG. 3 is an exemplary embodiment of a system 300 for provisioning vRBT services to one or more users. The system 300 may include Provider system 110, one or more network elements 110a-110c, and data storage 120. User devices 302 and 304 may be associated with Party A and Party B, respectively. User device 306 may be associated with Party C. User devices 302-306 may be communicatively coupled to each other, and to provider system 110, via network 118. User devices may be similar to user devices 102-114, as shown in FIG. 1.

With reference to FIGS. 2 and 3, an exemplary procedure for generating a vRBT using personal data interchanged video content from vCard, video tag and from NFC may include the following: Party A may share video content with Party B. The content may be shared over network 118, or may be directly shared using NFC hardware/software, if user devices 302 and 304 are NFC capable. For example, Party A may send the video content to Party B in an email or other electronic communication. The video content may be attached to a vCard which may contain party A's contact information. The term "vCard" may refer to a file format standard for electronic business cards. vCards may be attached to e-mail messages, but also may be exchanged on the internet or using instant messaging. vCards may contain name and address information, phone numbers, e-mail addresses, URLs, logos, photographs, audio clips, and video content. The video content may be directly attached to the vCard as a file. The video content may be a video tag or link to a website that streams the video, such as YouTube.

The video content may be from a variety of sources. For example, the video content may be user generated content (UGC). The video content may have been created by party A. In another example, the video content may have been created by a third-party, or party A may have previously purchased the video content. The video content may be one or more video clips capable of being played on a video-equipped user device. A video-equipped user device may include a smartphone, a tablet computer, a PDA, a cellphone, a laptop computer, a desktop computer, and other devices capable of play video content.

Party B may receive the video content from party A. If the video content was received as an attachment to a vCard in an email, Party B may import/export the contact information, the video clip or video tag by using an application. For example, the attached video content may be retrieved using an email application program, such as Outlook "Import and Export Wizard," and/or a tool from a provider service channel, such as provider 110. For example, Party B may use one or more software applications on device 304 to extract the video content or video tag.

User interface module 201 may be configured to allow party B to upload or transmit the video content to Provider system 110. User interface module 201 may provide a graphical user interface. The graphical user interface may be provided as a mobile application on one or more user devices, such as party B's user device 304 or party A's user device 302. User interface module 201 may be provide one or more websites where a party can upload video content.

User interface module 201 may transmit the video content to vRBT module 202. The video content may include one or more identifiers that identify the party that created or owns the video content. In this case, if party A created the video content, or owns the video content, the identifiers may identify party A using a caller ID, telephony number, name, physical address, email address, account number, or other identifying information. vRBT module 202 may create one or more vRBT clips that can be played on a video-equipped user device. The one or more vRBT clips may be based on the received video content.

In an alternative embodiment, party A may directly upload the video content to Provisioning system 110 via interface module 201. Party A may use user interface module 201 to assign the video content to one or more other users, using identifying information such as caller IDs or telephony numbers.

vRBT module 202 may be configured to create one or more vRBT clips based on the received video content. vRBT module 202 may create one or more vRBT clips using the video content received from party B (or party A). The one or more vRBT clips may be short video segments designed to be played on a video-enabled user device (such as party B device 304) when party B places a video call. vRBT module 202 may set the length of the vRBT clip based on predetermined limitations. For example, vRBT module 202 may be configured to automatically set the length for a vRBT clip to 30 seconds. Shorter or longer time limits may be used, depending on system needs. The length may be designated by party B (or party A) via user interface module 201. For example, user interface module 201 may present party A or B with a graphical user interface that allows them to edit the length of the vRBT clip based on the video content. If the video content is 1 minute long, party A or B may be able to select or highlight which portion or portions of the video content to designate as the vRBT. Party A or B may be able to select or highlight two separate 10 second segments of the video content, and vRBT module 202 may then combine the two selected segments into one 20 second vRBT clip.

vRBT module 202 may create multiple vRBT clips from the same video content. For example, party B may upload the 1 minute video content and create three different vRBT clips from it using the process described above. The first may be 20 seconds long, the second 30 seconds long, and the third may be the full 1 minute. vRBT module 202 may automatically create one vRBT clip that is the same length as the received video content.

Subscriber profile module 203 may update a vRBT subscriber profile for party A and/or party B based on the one or more vRBT clips. Subscriber profile module 203 may comprise one or more vRBT subscriber profiles. A vRBT subscriber profile may comprise data relating to a subscriber (such as Party A or Party B). A subscriber may be an individual or entity that subscribes to telephony services. A subscriber may be an individual or entity that subscribes to cable services. A subscriber may be an individual or entity that subscribes to internet services, or wireless telephony services, or a combination of the above.

Figure 8:
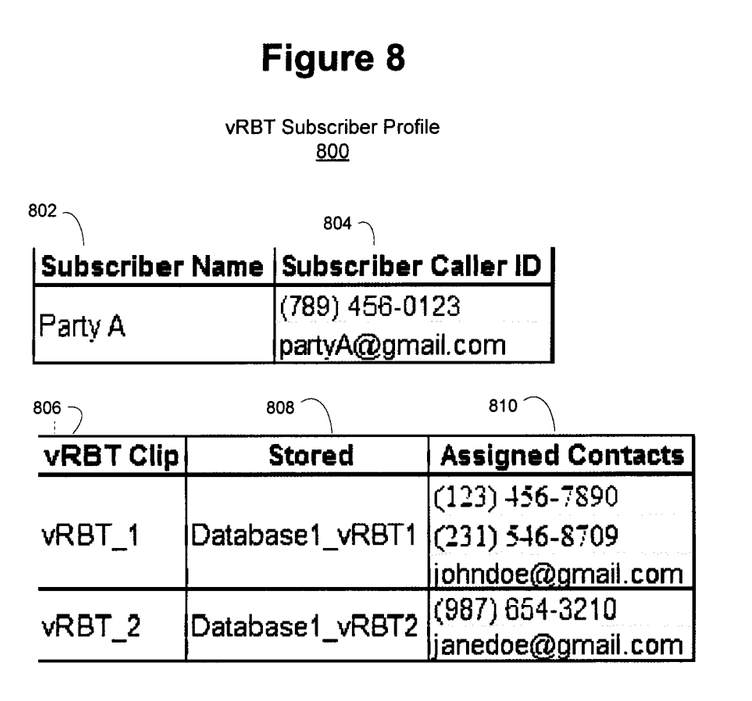
FIG. 8 is a graphical illustration of a vRBT subscriber profile according to a particular embodiment.

FIG. 8 shows an exemplary graphical depiction of a vRBT subscriber profile and the data that it may contain. The vRBT subscriber profile may include the name 802 of the subscriber (party A in FIG. 8). The vRBT subscriber profile may include the subscriber caller ID 804, which may include one or more telephony numbers, caller IDs, or email addresses associated with the subscriber's user devices. For example, Party A's vRBT subscriber profile would include the telephony or mobile number for device 302. The vRBT subscriber profile may include one or more subscriber email addresses. The exemplary vRBT subscriber profile may include entries 806 for each vRBT clip associated with that subscriber profile. The vRBT subscriber profile may include entries 808 showing where each vRBT clip is stored. The entries in 808 may be links or pointers to one or more locations in a queue, stack, database, or other storage medium. The vRBT subscriber profile may include entries 810 showing which vRBT clips are assigned to which caller IDs or telephony numbers. The vRBT subscriber profile may include other relevant information relating to the vRBT clips or the vRBT subscriber. The vRBT subscriber profile may include demographic data related to the subscriber. The vRBT subscriber profile may include the subscriber's physical address, location information that may be GPS-related, and other identifying information associated with the subscriber. vRBT subscriber profiles may additionally or alternatively be stored at data storage 120. vRBT subscriber profiles may be stored externally.

Control module 204 may be configured to control the operations and manage the resources used by user interface module 201, vRBT module 202, subscriber profile module 203, verification module 205, and playback module 206. Control module 204 may determine that vRBT module 202 module has prepared the one or more vRBT clips. Control module 204 may cause subscriber profile module 203 to associate the one or more vRBT clips with a vRBT subscriber profile based on identifiers from the video content for the vRBT clip. In this example, because party A originally sent the video content to party B, the vRBT clip may include party A's caller ID, thus designating party A as the original owner or creator of the video content. Subscriber profile module 203 may associate party A's vRBT subscriber profile with the vRBT clip. Party A may have multiple telephony numbers or lines associated with his vRBT subscriber profile (e.g., work line, personal line). Party A may have a separate vRBT subscriber profile for each telephony number. Subscriber profile module 203 may associate the vRBT clip with all of party A's vRBT subscriber profiles. Subscriber profile module 203 may associate only one of party A's subscriber profiles with the vRBT clip. This may be based on input from party A (or another party). The vRBT clip may be stored in data storage 120 and linked to party A's vRBT subscriber profile by subscriber profile module 203.

For example, referring to FIG. 8, vRBT subscriber profile module may associate two vRBT clips (vRBT_1 and vRBT_2) with party A's vRBT subscriber profile 800. Party A's vRBT subscriber profile 800 may include entries (808) with pointers to where each vRBT clip is stored.

Subscriber profile module 203 may also assign the one or more vRBT clips to one or more caller IDs, email addresses, telephony numbers, or other caller identifiers. For example, because party B uploaded the video content originally owned by party A, subscriber profile module 203 may assign the vRBT clip to any incoming video calls from party B to party A, using party B's caller ID. Thus, in the future, if party B places a video call to party A, the vRBT clip may be played on party B's device until party A answers the call or the call goes to voicemail, as will be described below. Subscriber profile module 203 may assign the vRBT clip to multiple subscribers or multiple caller IDs (even if the caller IDs are not associated with subscribers).

For example, referring again to FIG. 8, subscriber profile module 203 may update party A's vRBT subscriber profile to assign vRBT_1 to contact (123) 456-7890 (shown under 810). In FIG. 8, vRBT_1 has been assigned to three contacts. vRBT_2 has been assigned to two contacts.

In another exemplary embodiment, party B may desire to "share" the video content with other users. Party B may indicate this using user interface module 201. If the video content is to be shared, subscriber profile module 203 may associate the vRBT clip with party B's vRBT subscriber profile and assign it to other caller IDs that may be designated by party B. For example, party B may instruct the provisioning system 110 to share the vRBT with party C. Subscriber profile module 203 may then assign the vRBT clip to party C in party B's vRBT subscriber profile. If party B does not already have a vRBT subscriber profile, subscriber profile module 203 may create one for him. Thereafter, if party C places a video call to party B, the vRBT clip may be played on party C's user device 306 before party B answers.

Party B may initiate a video call with Party A. The video call may be setup via SIP signaling using network 118 and provider system 110. Provider system 110 may receive one or more signals indicating that party B is initiating a video call with party A. Verification module 205 may retrieve party A's vRBT subscriber profile and determine if any vRBT clips are assigned to party B based on party B's calling information. Party B's calling information may include a caller ID, telephony number, email address, or other identifiying information.

Verification module 205 may determine whether party B has a video equipped device. If party B's device 304 is equipped to play videos, then verification module 205 may signal playback module 206 to stream the correct vRBT clip to party B's user device 304. Party B may then see the vRBT clip played on his user device 304 while he waits for party A to answer the video call, ignore the call, or send the call to voicemail.

If verification module 205 determines that party B does not have a video equipped device, then playback module 206 may stream an aRBT instead based on the audio codecs in the SDP.

If Party A's vRBT subscriber profile includes a vRBT clip assigned to party B's caller ID, playback module 206 may retrieve the one or more vRBT clips from data storage 120. Playback module 206 may determine the right format to play back the vRBT clip based on the video specification in the Session Description Protocol (SDP) associated with the video call initiation between party B and party A. Playback module 206 may negotiate the correct video codec for playing back the one or more vRBT clips.

Thus, for example, referring to FIG. 8, if vRBT subscriber profile 800 is party A's vRBT subscriber profile, and a video call from telephony number (987) 654-3210 is placed to party A's device, playback module 206 may check party A's vRBT subscriber profile module and determine that vRBT_2 has been assigned to the contact (987) 654-3210. Playback module 206 may retrieve vRBT_2 from the appropriate database (shown in column 804) and play the clip vRBT_2 on the calling device while the caller waits for party A to answer, ignore the call, or send the call to voicemail. Playback module 206 may stream the vRBT clip to party B's device for a predetermined period of time. If party A does not answer the call within the predetermined period of time, playback module 206 may stop streaming the vRBT clip. If party A chooses to ignore the call, deny the call, or send it to voicemail, playback module 206 may stop streaming the vRBT clip.

Figure 4:
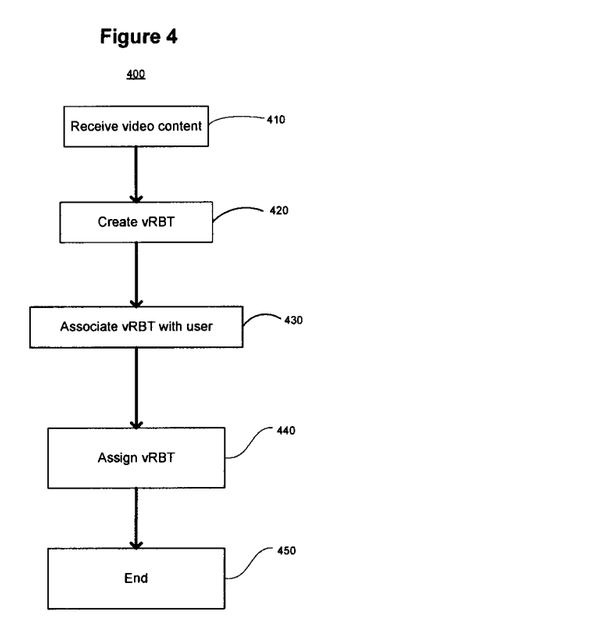
FIG. 4 is a block diagram a method of a particular embodiment.

FIG. 4 illustrates a flow diagram of a method 400 for creating a vRBT for a user. This exemplary method 400 is provided by way of example, as there are a variety of ways to carry out the method. The method 400 shown in FIG. 4 can be executed or otherwise performed by one or a combination of various systems. The method 400 described below may be carried out by the systems shown in FIGS. 1-3, by way of example, and various elements of systems 100, 200, and 300 are referenced in explaining the exemplary method of FIG. 4. Each block shown in FIG. 4 represents one or more processes, methods or subroutines carried out in exemplary method 400. Referring to FIG. 4, exemplary method 400 may begin at block 410.

At block 410, the provisioning system 110 may receive video content. The video content may be received from one or more user devices connected to provisioning system 110, or another provider system, via one or more networks, such as network 118 (as shown in FIGS. 1 and 3). The video content may include a variety of formats. For example, the video content may be one or more digital video files. The video content may be a video tag. The video content may be a link to a website that streams videos. The video content may be user generated. The video content may have been previously purchased. The video content may be received from another provider system.

User interface module 201 may be configured to allow a party to upload or transmit the video content to Provider system 110. User interface module 201 may be a graphical user interface. User interface module 201 may provide the graphical user interface as a mobile application on one or more user devices. User interface module 201 may be provide the graphical user interface on a website. The video content may be sent to vRBT module 202. The video content may include one or more identifiers that identify the party that created the video content (or that owns the video content). The identifiers may include, for example, a caller ID, telephony number, or email address of a party. In the example in FIG. 3, if party A created the video content, or owns the video content, the identifiers may include party A's caller ID or other identifying information. Method 400 may proceed to block 420.

At block 420, vRBT module 202 may create a vRBT clip that can be played on a video-equipped user device. vRBT module 202 may be configured to create one or more vRBT clips based on the received video content. The one or more vRBT clips may be short segments designed to be played on a video-enabled user device (such as party B device 304 in FIG. 3) when party B places a video call. vRBT module 202 may set the length of the vRBT clip based on predetermined settings. vRBT module 202 may set the length of the vRBT clip based on input from party B (or party A). vRBT module 202 may be configured to automatically set the length of the vRBT clip to a pre-set length, such as 10 seconds. Other pre-set time limits may be used. Method 400 may proceed to block 430.

At block 430, subscriber profile module 203 may associate the one or more vRBT clips with one or more vRBT subscriber profiles. A vRBT subscriber profile may be accessed by subscriber profile module 203. If a subscriber or user uploaded the video content, that party may designate the user or subscriber that owns the video. The subscriber profile module may store the vRBT clips in data storage 120 and link the stored vRBT clips to one or more vRBT subscriber profiles (shown in 806 and 808 of FIG. 8). Subscriber profile module may update the vRBT subscriber profile to include the name of the vRBT clip. Party A (or Party B) may name the clip using user interface module 201. vRBT subscriber profile module 203 may automatically name the vRBT clip.

Once a vRBT clip has been associated with a subscriber profile, in the future, when subscriber module 202 (or other modules) accesses that subscriber's profile, profile may indicate that the subscriber has one or more vRBT clips for potential playback when that subscriber receives a video call. Method 400 may proceed to block 440.

At block 440, subscriber profile module 203 may assign the one or more vRBT clips based on the identifiers or based on user selections. The vRBT clips may be assigned to one or more caller IDs, email addresses, and/or telephony numbers associated with other subscribers or users (shown in 810 of FIG. 8). Once a vRBT clip has been assigned to a certain caller ID, if a party with that caller ID attempts to place a video call to the subscriber, the vRBT clip may be played on the calling party's device before the called party answers. Subscriber profile module 203 may assign the vRBT clip to multiple subscribers or multiple caller IDs (even if the caller IDs are not associated with subscribers). In other embodiments, once a vRBT clip has been associated with a subscriber profile, provider system 110 may notify the subscriber that this has occurred. The notification may be sent as an email, SMS, text message, or other electronic notification. The notification may request the recipient subscriber to confirm whether the vRBT clip should be assigned. Method 400 may proceed to block 450.

At block 450, method 400 may end.

Figure 5:
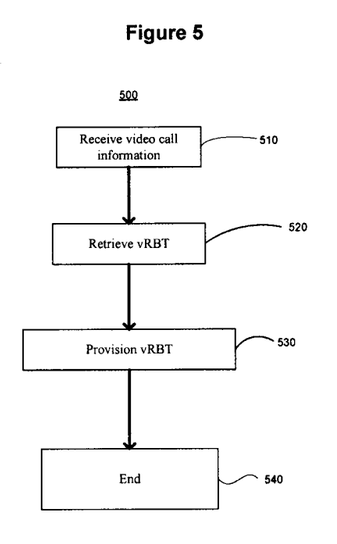
FIG. 5 is a block diagram illustrating a method of a particular embodiment.

FIG. 5 illustrates a flow diagram of a method 500 for playing a vRBT for a party initiating a video call. This exemplary method 500 is provided by way of example, as there are a variety of ways to carry out the method. The method 500 shown in FIG. 5 can be executed or otherwise performed by one or a combination of various systems. The method 500 described below may be carried out by the systems shown in FIGS. 1-3, by way of example, and various elements of systems 100, 200, and 300 are referenced in explaining the exemplary method of FIG. 5. Each block shown in FIG. 5 represents one or more processes, methods or subroutines carried out in exemplary method 500. Referring to FIG. 5, exemplary method 500 may begin at block 510.

At block 510, provider system 110 may receive video call information. The video call may be initiated from one or more subscribers. The video call may be initiated by a user of a third-party provider and then sent to a subscriber of provider system 110. The video call may be setup via SIP signalling using network 118 and provider system 110. The video call may be routed through one or more gateway routers. In the exemplary embodiment shown in FIG. 3, provider system 110 may receive one or more signals indicating that party B is initiating a video call with party A. Method 500 may proceed to block 520.

At block 520, verification module 205 may retrieve vRBT subscriber profile data for the called party. Verification module 205 may determine if any vRBT clips are assigned to the calling party based on the calling party's caller ID, telephony number, and/or email address. If the called party's vRBT subscriber profile includes a vRBT clip assigned to the calling party, verification module 205 may signal playback module 206 to retrieve the one or more vRBT clips assigned to the calling party from data storage 120. Method 500 may proceed to block 530. So for example, referring to FIG. 3 and FIG. 8, if party B is calling party A from a video-equipped device having the number (987) 654-3210, verification module 205 would retrieve party A's vRBT subscriber profile 800 and determine that vRBT_2 has been assigned to party B's telephony number (based on entries 806 and 810).

At block 530, Playback module 206 may provision the one or more vRBT clips based on the determination by verification module 205. Playback module 206 may determine the right format to play back the vRBT clip based on the video specification in the Session Description Protocol (SDP) associated with the video call initiation between the two or more user devices. Playback module 206 may negotiate the correct video codec for playing back the one or more vRBT clips.

Verification module 205 may determine whether the calling party has a video equipped device. If the calling party's device is equipped to play videos, then verification module 205 will signal playback module 206 to stream the correct vRBT clip to the calling party's device as a "ring tone." Playback module 206 will then stream the vRBT clip to the calling party's device while he waits for the called party to answer the call. Referring to the previous example, playback module 206 may stream vRBT_2 to party B's phone as the video ring-back tone. The vRBT clip may be played for a predetermined amount of time. If the vRBT clip ends before the called party answers, then the playback module 206 may play the vRBT clip again from the beginning. The vRBT clip may play until the calling party ends the call attempt. The vRBT clip may be played until the call is sent to the called party's voicemail. The vRBT clip may be played until the called party ignores the call. Method 500 may then proceed to block 540.

At block 540, method 500 may end.

Figure 6:
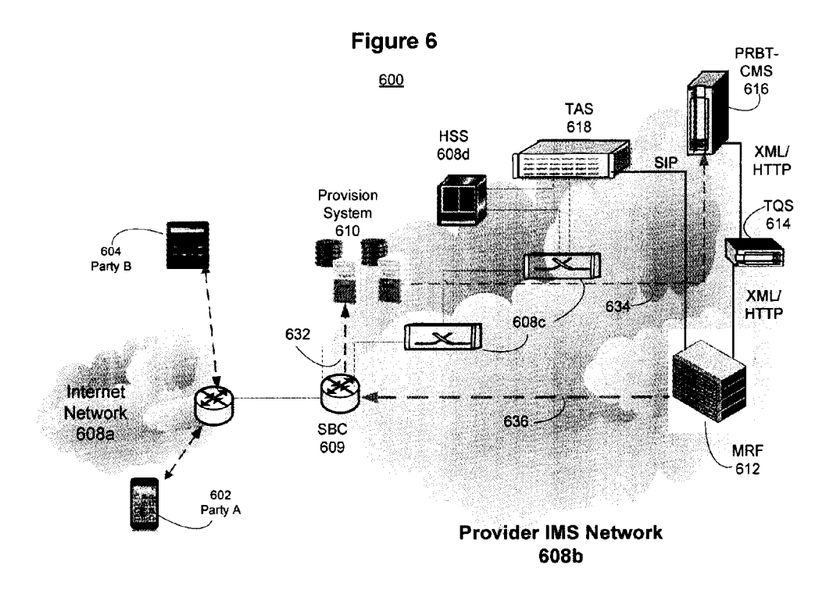
FIG. 6 is a schematic diagram illustrating a system according to a particular embodiment.

FIG. 6 shows an exemplary embodiment of a system 600 for provisioning vRBT services. In FIG. 6, Provider IMS Network 608b may include one or more network elements to provide both telephony services and vRBT services. Provider IMS network 608b may include Media Resource Function (MRF) Module 612, Tone Query Server (TQS) 614, Personal Ring Back Tone-Content Management Server (PRBT-CMS) 616, Telephony Application Server (TAS) 618, one or more session border control (SBC) routers 609, provisioning system 610, one or more network elements 608c, and home subscriber server (HSS) 608d. It is also noted that the system 600 illustrates only a single instance of each component. It will be appreciated that multiple instances of these components may be used. Moreover, the system 600 may include other devices not depicted in FIG. 6.

As shown in FIG. 6, party A 602 and party B 604 may be communicatively connected to each other and to Provider IMS network 608b via one or more networks 608a, such as an internet network. Network elements 608c may include one or more call session control functions (CSCF). These may include one or more Proxy-CSCFs, Serving CSCFs, and Interrogating CSCFs. These may act to process SIP signaling packets in provider IMS network 608b, as is known in the art. HSS 608d may act with network elements 608c and TAS 618 to provide telephony services to Party A and Party B.

TAS 618 may include a subscriber profile for every subscriber to telephony services provided by Provider IMS network 608b. Each subscriber profile in TAS 618 may indicate whether that subscribers profile is associated with one or more vRBT services.

MRF module 612 may be hardware configured to convert one or more vRBTs into IP packets and play them back to the calling party device, such as when party B calls party A (as described in conjunction with FIG. 5). MRF Module 612 may be communicatively coupled to one or more SBC gateways 609 via one or more connections 636. Connection 636 may correspond to step 530 in FIG. 5.

TQS 614 may comprise one or more vRBT subscriber profiles, such as the exemplary profile shown in FIG. 8. If TQS 614 receives an indication that, for example, party B is placing a video call to party A via provider IMS network 608b, TQS 614 may determine which, if any, vRBT clips should be played on party B's device, retrieve the appropriate clips from PRBT-CMS 616, and provide them to MRF 612. TQS 614 may include other subscriber profile information, such as when to play each vRBT clip, or for how long.

PRBT-CMS 616 may act as the main server for the vRBT provisioning service. It may receive and store the vRBT clips received from one or more subscribers or parties, such as party A or party B, which may be received via connections 632 and 634. It may control the operation of TQS 614 and/or MRF Module 612. TQS 614, MRF 612, and PRBT-CMS 616 may be communicatively coupled via one or more HTTP/XML connections.

If, for example, Party B places a video call to Party A via provider IMS network 608b, TAS 618 will determine if party A and party B have video equipped devices and provide one or more signals to PRBT-CMS 616, TQS 614, and/or MRF 612 to begin the vRBT provisioning process, as described with reference to FIG. 5.

Figure 7:
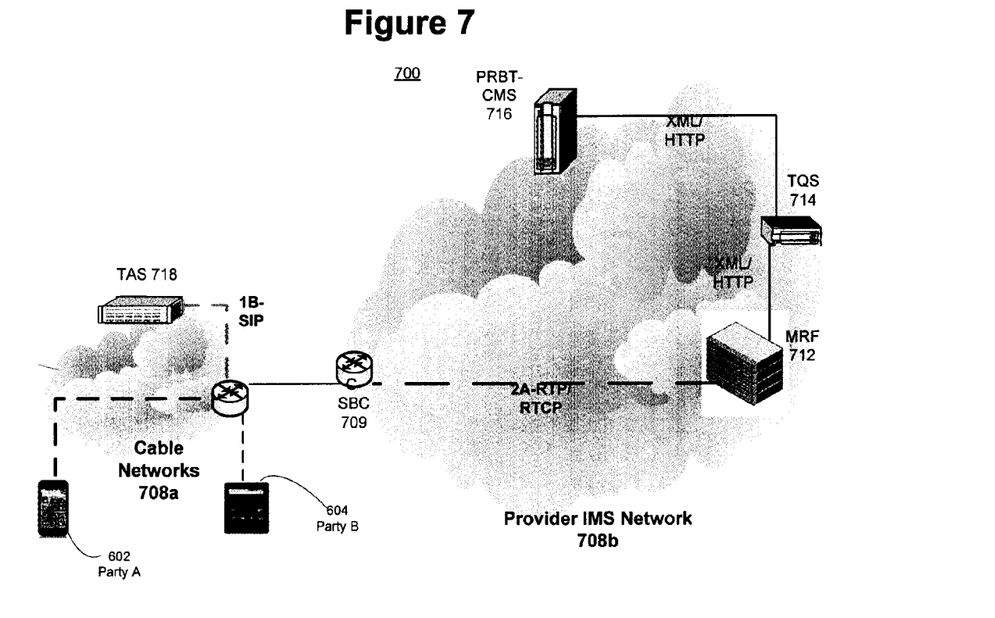
FIG. 7 is a schematic diagram illustrating a system according to a particular embodiment.

FIG. 7 shows an exemplary embodiment of a system 700 for provisioning vRBT services. In FIG. 7, Provider IMS Network 708b may include one or more network elements to provide vRBT services in conjunction with one or more cable networks 708a. Provider IMS network 708b may include Media Resource Function (MRF) Module 712, Tone Query Server (TQS) 714, Personal Ring Back Tone-Content Management Server (PRBT-CMS) 716, and C-SBC router 709. It is also noted that the system 700 illustrates only a single instance of each component. It will be appreciated that multiple instances of these components.

In FIG. 7, as opposed to system 600 in FIG. 6, the telephony services are provided by cable networks 708a, instead of provider IMS network 708b. Thus, if party B places a video call to party A, the video call will be setup and handled using one or more network elements and servers in cable network 708a, such as TAS 718. The vRBT services will be separately provided by provider IMS network 708b, similar to how the vRBT services were provided in FIGS. 3 and 6.

It is to be appreciated that the set of instructions, e.g., the software that configures the computer operating system to perform the operations described above may be contained on any of a wide variety of media or medium, as desired. Further, any data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by a computer.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

We claim:

1. A system, comprising:
one or more network-enabled computers, each of the network enabled computers configured to:
receive media data from a first device over a network, wherein the media data was previously exchanged between the first device and a subscriber using one of email, text message, SMS, or Near Field Communications;
prepare one or more video clips based on the media data, wherein preparation of the one or more video clips based on the media data comprises receiving instructions from the first device relating to a first length of at least one of the one or more video clips and setting a length of the at least one of the one or more video clips to match the first length;
associate the one or more video clips with at least one profile of the subscriber based on subscriber contact information included with the media data;
link, in the at least one profile of the subscriber, the one or more video clips with at least one of an email address, caller ID, and telephony number of the first device;
receive information from a device indicating a calling party is attempting to place a call to the subscriber;
compare the information to at least one of the email address, caller ID, and telephony number of the first device in the at least one profile of the subscriber; and
provide the one or more video clips to the device over a network upon determining that the information matches the at least one of an email address, caller ID, and telephony number of the first device.

2. The system of claim 1, wherein the media data comprises one of video content, video tag, or a video link.

3. The system of claim 1, wherein the call is a video call.

4. The system of claim 3, wherein the call is a Voice Over IP call.

5. The system of claim 1, wherein providing the one or more video clips comprises streaming the one or more video clips to the device associated with the calling party.

6. The system of claim 5, wherein the one or more video clips are streamed to the calling party device and played on the calling party device until at least one of the subscriber answers the video call, the call is sent to voicemail, the calling party device terminates the call, or the call is rejected.

7. The system of claim 5, wherein the one or more video clips are streamed to the calling party device for a predetermined amount of time.

8. The system of claim 1, wherein the media data was previously exchanged as an attachment to a vCard.

9. The system of claim 1, wherein the one or more network enabled computers are further configured to:
receive instructions from the first device to associate the one or more video clips with a second subscriber profile, wherein the instructions include at least one of an email address, caller ID, and telephony number of a second device; and
store the at least one of an email address, caller ID, and telephony number of the second device in the second subscriber profile.

10. A method comprising:
receiving media data from a first device over a network, wherein the media data was previously exchanged between the first device and a subscriber using one of email, text message, SMS, or Near Field Communications;
preparing one or more video clips based on the media data, wherein preparation of the one or more video clips based on the media data comprises receiving instructions from the first device relating to a first length of at least one of the one or more video clips and setting a length of the at least one of the one or more video clips to match the first length;
associating the one or more video clips with at least one profile of the subscriber based on subscriber contact information included with the media data;
linking, in the at least one profile of the subscriber, the one or more video clips with at least one of an email address, caller ID, and telephony number of the first device;
receiving information from a device indicating a calling party is attempting to place a call to the subscriber;
comparing the information to at least one of the email address, caller ID, and telephony number of the first device in the at least one profile of the subscriber; and
providing the one or more video clips to the device over a network upon determining that the information matches the at least one of an email address, caller ID, and telephony number of the first device.

11. The method of claim 10, wherein the media data comprises one of video content, video tag, or a video link.

12. The method of claim 10, wherein the call is a video call.

13. The method of claim 12, wherein the call is a Voice Over IP call.

14. The method of claim 12, wherein providing the one or more video clips comprises streaming the one or more video clips to the device associated with the calling party.

15. The method of claim 14, wherein the one or more video clips are streamed to the calling party device and played on the calling party device until at least one of the subscriber answers the video call, the call is sent to voicemail, the calling party device terminates the call, or the call is rejected.

16. The method of claim 14, wherein the one or more video clips are streamed to the calling party device for a predetermined amount of time.

17. The method of claim 10, wherein the media data was previously exchanged as an attachment to a vCard.

18. The method of claim 10, further comprising:
receiving instructions from the first device to associate the one or more video clips with a second subscriber profile, wherein the instructions include at least one of an email address, caller ID, and telephony number of a second device; and
storing the at least one of an email address, caller ID, and telephony number of the second device in the second subscriber profile.

* * * * *